United States Patent [19]

McRae

[11] 4,163,209

[45] Jul. 31, 1979

[54] TECHNIQUE FOR CONTROLLING MEMORYFUL NON-LINEARITIES

[75] Inventor: Daniel D. McRae, West Melbourne, Fla.

[73] Assignee: Harris Corporation, Melbourne, Fla.

[21] Appl. No.: 837,443

[22] Filed: Sep. 28, 1977

[51] Int. Cl.² .............................................. G08C 25/00
[52] U.S. Cl. ............................... 340/146.1 E; 325/323
[58] Field of Search ................. 340/146.1 R, 146.1 E; 325/41, 42, 65, 323; 179/175.3 R

[56] References Cited

U.S. PATENT DOCUMENTS

| | | | |
|---|---|---|---|
| 3,611,149 | 10/1971 | Kimball | 325/323 |
| 3,621,139 | 11/1971 | Gibson | 340/146.1 R |
| 3,657,698 | 4/1972 | Durteste et al. | 340/146.1 R |
| 3,696,203 | 10/1972 | Leonard | 325/323 |
| 3,875,500 | 4/1975 | Fletcher et al. | 340/146.1 E |
| 3,959,770 | 5/1976 | Schaefer | 325/41 |

Primary Examiner—Charles E. Atkinson
Attorney, Agent, or Firm—Craig and Antonelli

[57] ABSTRACT

The influence of memoryful non-linearities on a serial data sequence is combatted by initially analyzing a transmitted test or training data sequence, the contents of which are known and, from this analysis, a decoding scheme, referred to as a look-up table, is prepared. The look-up table contains a set of averaged threshold parameters with which subsequently received data signals, the values of which are unknown, are to be compared. From these comparisons, decisions are made as to what data signals were actually transmitted. Further, the decisions may be refined by carrying out a second iteration of comparisons on the previous choice for the sequence of transmitted data signals, thereby enhancing the reduction in error rate.

Implementation of the above technique may incorporate a storage device such as a conventional random access memory into which threshold values for a sequence of training data signals are written during a training transmission and, for each identification of the same data symbol, its threshold value in memory is updated by averaging the new value with each of the received preceding values, so that, at the end of the training sequence, the memory contains threshold comparison values representative of the average value of each data symbol transmitted.

29 Claims, 3 Drawing Figures

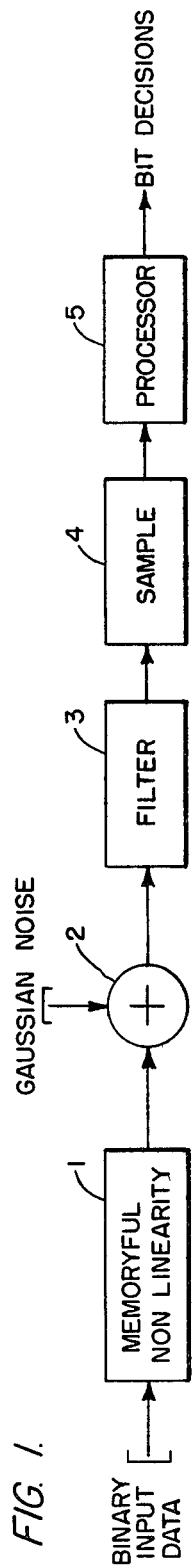
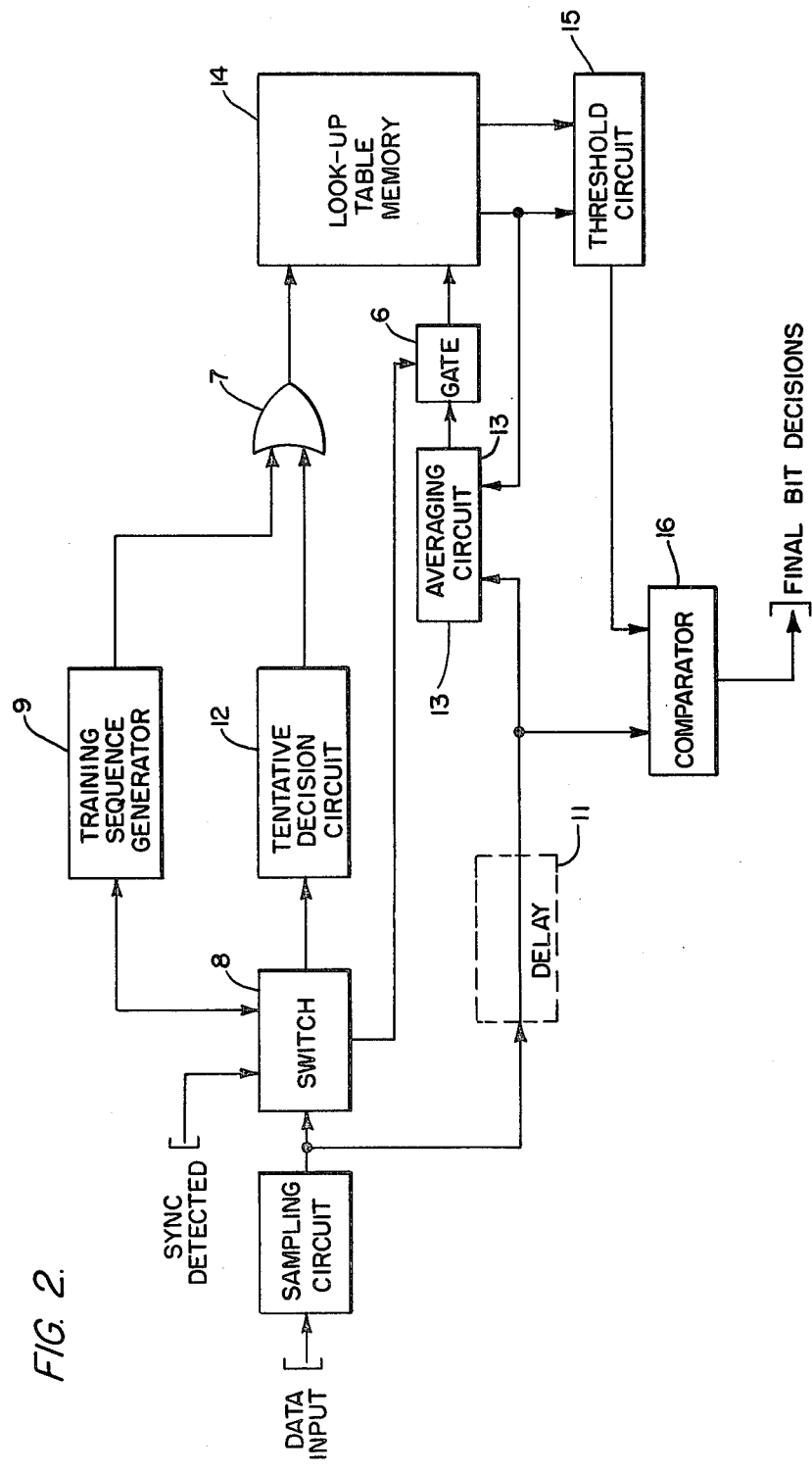

FIG. 3

TECHNIQUE FOR CONTROLLING MEMORYFUL NON-LINEARITIES

The United States Government has rights in this invention pursuant to contract number F30602-75-C0129 awarded by the Department of the Air Force.

FIELD OF THE INVENTION

The present invention relates to communication systems and particularly to arrangements for reducing or combatting system performance degradation created by memoryful channel non-linearities.

BACKGROUND OF THE INVENTION

In present day communication systems there are many transmission media which contain both memoryful elements and non-linear elements that undesirably affect the fidelity of information passing through the media and require the use of error or distortion correction circuitry to overcome the influence of these factors on the received signal.

An example of such a medium is the telephone channel which contains both linear filters and non-linear elements that produce harmonic distortion. When high rate digital signals are transmitted through such a channel, the combination of the disturbances produced by each of these elements degrades the error rate of the received signal in such a manner that cannot be accomodated well by presently available processing techniques.

SUMMARY OF THE INVENTION

In accordance with the present invention, the influence of memoryful non-linearities within the transmission medium is substantially reduced by a technique which initially examines the degree of error or distortion introduced into a received signal that has been transmitted through such a medium, the examination preferably being conducted with prior knowledge of the information contained in the signal. Rather than attempt to analyze the disturbance itself, the present invention analyzes its effect on a test or training data sequence and from this analysis a decoding scheme, referred to as a look-up table, is prepared. The look-up table contains a set of averaged threshold parameters with which subsequently received data signals, the values of which are unknown, are to be compared. From these comparisons, decisions are made as to what data signals were actually transmitted. Further, the decisions may be refined by carrying out a second iteration of comparisons on the previous choice for the sequence of transmitted data signals, thereby enhancing the reduction in error rate.

Implementation of the above technique may incorporate a storage device such as a conventional random access memory into which threshold values for a sequence of training data signals are written during a training transmission, and for each identification of the same data symbol, its threshold value in memory is updated by averaging the new value with each of the received preceding values, so that, at the end of the training sequence, the memory contains threshold comparison values representative of the average value of each data symbol transmitted.

For the purposes of simplifying the explanation of the invention, the description to follow will treat the technique of combatting memoryful non-linearities for a transmitted sequence of binary symbols. It should be observed, however, that the invention is not limited only to the example described but is applicable to virtually any type of serial transmission scheme. Moreover, the transmission modulation technique is not restricted to any particular type, the present invention having essentially universal application, in this regard.

BRIEF DESCRIPTION OF THE DRAWINGS

FIG. 1 is a block diagram of a transmission medium containing a memoryful non-linearity;

FIG. 2 is a schematic block diagram of a circuit configuration for processing a sequence of data signals subjected to memoryful non-linearities; and FIG. 3 is a schematic block diagram of a modified version of the circuit configuration illustrated in FIG. 2.

DETAILED DESCRIPTION

FIG. 1 is a simplified diagram of a typical transmission medium, such as telephone transmission channel, through which data signals are transmitted and subjected to the type of distortion which the present invention seeks to combat.

To facilitate the description, it will be assumed that the data being transmitted is in the form of a sequence of binary symbols, ones and zeros, such as ". . . 01011001110 . . . ", each digital symbol being represented by some parametric value, such as a voltage level, which is monitored in receiver circuitry to determine if a particular transmitted bit is a "1" or a "0". As an example, assume that during any bit time, a transmitted data representative voltage will be either plus or minus one volt, independent from bit to bit and equally likely in polarity. Thus, for an arbitrary five bit data sequence, 01101, letting +1 volt represent a "1" bit and −1 volt represent a "0" bit, the corresponding transmitted sequence of voltages would be −1 v, +1 v, +1 v, −1 v, +1 v, each bit having a prescribed finite duration. This binary symbol-representative voltage sequence passes through a memoryful non-linearity 1 and a filter 3 during its course of transmission through the channel. In addition, additive gaussian noise is imparted to the signal, represented by a noise summation 2. The distortion introduced by these elements causes the originally transmitted voltage levels of +1 and −1 volts to depart from their intended values in a direction of either polarity and of magnitudes which prevent a simple prediction of the transmitted bits based upon a constant voltage threshold. After filtering, the distorted signal contains zero mean gaussian random variables, of a standard deviation $\sigma_n$ each sample time, which are uncorrelated with one another or the signal. Thus, as the signals are analyzed for each sample time 4 in processor 5, to obtain bit decisions as to the sequence of transmitted bits, some technique must be employed to minimize the error rate in the bit detection process.

In accordance with its novel distortion correction scheme, the invention assumes that the total memory characteristic of the transmission channel between the input and sampling device is finite, so that the number of different noise free values that samples can assume is also finite, regardless of the nature of the memoryful non-linearity. As an initial example, let it be assumed that the memory span of the memoryful non-linearity 1 and filter 3 combined is two bits in length and that there is no memory outside this range. In such a case, the values of the noise free samples (or average sample value when noise is present) can be tabulated with four entires as shown in Table 1 below.

TABLE 1
(Two bit look-up Table)

| Binary Input (two bit sequence) | Sample value into processor |
|---|---|
| 00 | −0.5 volts |
| 01 | +0.1 volts |
| 10 | −0.1 volts |
| 11 | +1.0 volts |

The sample value represents the measured voltage for the right hand binary bit of the two binary bits in the left hand portion of the Table 1.

The usual approach for making bit decisions in this case would be simply to observe the polarity of the received sample value and assign the value of the received bit as a "0" if the polarity is negative and as a "1" if the polarity is positive. If the standard deviation of the noise samples is assumed to be 0.2 volts, it can be seen that using such an assignment technique creates a possible error in the choice for those tabulated bits the measured values of which are +0.1 volts and −0.1 volts.

If the value of the lefthand, or first, bit for each set of two bits of Table 1 were known, a decision on the right-hand bit could be made by setting a threshold voltage value half way between the two sample values of the two patterns in question. Namely, the four binary pairs of Table 1 can be grouped into sets based upon an assumed knowledge of the value of the first bit. Thus, pairs or sets (00,01) and (10,11) may be established and voltage thresholds determined on the basis of the average between the values measured for the bit in question. Therefore, for the set (00,01) a voltage threshold may be set at −0.2 volts, while for the set (10,11), the voltage threshold would be +0.55 volts. Once these thresholds have been established, the voltage measured for a bit X in question will be compared with either −0.2 volts or +0.55 volts depending upon the binary value of the preceding bit, i.e. depending upon whether the bit X forms with the preceding bit the set (0X) or the set (1X), and the value (1 or 0) for the measured bit is chosen in dependence upon whether it is larger or smaller than the threshold for that set.

In accordance with the present invention, threshold values are established by analyzing the measured values for a training sequence of received binary bits, which sequence is known beforehand and, from these measured values, a look-up table of threshold values, similar to Table 1, with which subsequently received and measured data is to be compared, is prepared. In assembling the look-up table, the measured values are averaged over the entire training sequence. The threshold value of the final decision of a second bit for any two bit sequence or pair is then adjusted to a value halfway between the two appropriate table entries for the final decision.

FIG. 2 shows a schematic block diagram of a circuit configuration by which the above process may be implemented. To facilitate the description, a completely digital embodiment is illustated.

Input data from the transmission channel containing the memoryful non-linearity and filter is sampled in sampling circuit 10 and applied through switch 8 to a tentative decision circuit 12. Sampling circuit 10 samples an incoming data signal at periodic intervals and generates a digital signal representative of the magnitude and polarity of the sample. A conventional gating and quantizer circuit may be used for this purpose with the output digital word including the appropriate sign bit. The polarity of the digital data sample is then examined by tentative decision circuit 12 which may consist of a straight-forward logic circuit generating a "1" if the sign bit of the sample word is a "0", representative of a positive polarity, and generating a "0" if the sign bit of the sample word is a "1", representative of a negative polarity. These values are stored for two bits and the resulting pair (00, 01, 10, or 11) is then used to define an address of one of four address locations in look-up table memory circuit 14.

Preferably, the look-up table is prepared by comparing the received values of a training sequence transmitted through the channel with a copy of the original sequence being stored in training sequence generator 9. The transmitted training sequence is preceded by the appropriate sync signal code which causes switch or gating circuit 8 to connect the output of sampling circuit 10 to training sequence generator 9. Training sequence generator 9 then couples a prescribed address sequence to memory 14 through OR gate 7 in synchronism with each sample, which address sequence is defined in accordance with the successive bit pairs contained in the transmitted binary training sequence. Thus, for a binary training sequence 010110011101 . . . , generator 9 would successively generate memory addresses defined in accordance with the successive bit pairs 01-10-01-11-10-00-01-11-11-10-01 . . . . Namely, as the sequence is traversed, bit by bit, the succeeding bit of the previous bit pair becomes the preceding bit of the next bit pair. The sampled value for the second bit in each of these pairs is supplied to averaging circuit 13, and combined with the contents of the address locations of memory 14 defined by these successive bit pairs. The new or updated averaged values are then rewritten into memory 14 via gate 6 which is enabled by switch 8 during the training sequence and may be disabled during the processing of unknown data. At the conclusion of the training sequence, switch circuit 8 may respond to another sync code and thereby connect the output of sampling circuit 10 to tentative decision circuit 12.

During the processing of each bit of stream data, the sequence of bits of which are unknown, switch 8 connects sampling circuit 10 to decision circuit 12 while disabling the path to generator 9, the training sequence having been completed, and a pair of addresses are generated by tentative decision circuit 12 and coupled through OR gate 7 to cause the averaged contents of the addresses in memory 14, corresponding to one of the above referred to pairs or sets, to be applied to the respective inputs of threshold circuit 15. Thus, if the two adjacent bits identified by tentative decision circuit 12 are the pair (11), threshold circuit 15 will receive the contents of the memory location having addresses corresponding to bit pairs (11) and (10) from memory 14.

Threshold circuit 15 examines the values of the contents of the address locations of the look-up table memory 14 supplied to it and generates an output corresponding to a value halfway between these values. Threshold circuit may comprise a full adder with a shift-right of the digital sum. This digital threshold value is supplied to comparator 16 which compares the sampled data word with the output of threshold circuit 15. If the value of the data word exceeds the threshold value, the output of comparator 16 is "1"; if the value of the data word does not exceed the threshold value, the output of comparator 16 is a "0".

Figure 3:
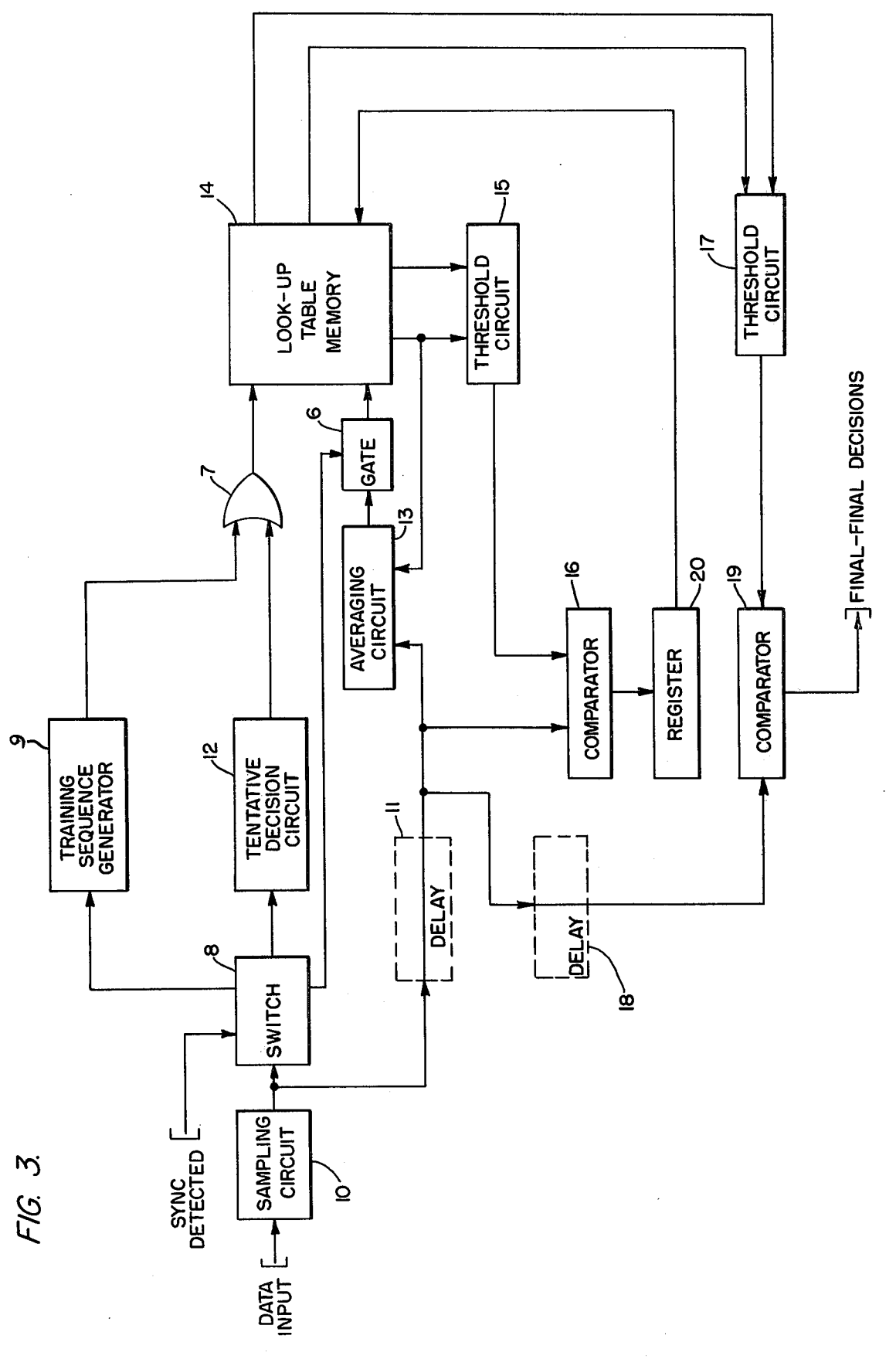

The foregoing implementation has been found to provide an error rate considerably improved as compared with the simple binary decisions based strictly on polarity of each analyzed bit. Still, apparently due to the use of simple polarity decisions at the step immediately preceding the final decision process, the performance of the system is influenced to an undesirable degree by errors made during the tentative decisions. Improvement upon the scheme shown in FIG. 2 can be achieved by a second or final-final iteration of the look-up table approach. More specifically, a further threshold decision may be carried out using the implementation shown in FIG. 3.

The configuration shown in FIG. 3 includes the same components shown in FIG. 2 with the addition of further threshold and comparison circuits. Specifically, the final decision or first iteration output of comparator 16 is stored in register 20 in the same manner that successive bit pairs are stored in tentative decision circuit 12. Successive bit pairs from the final decision are used to address look-up table memory 14 so that threshold values will be extracted for the final decisions and supplied to threshold circuit 17. Threshold circuit 17 may be identical to threshold circuit 15, comparing the contents of the pair of addressed locations in memory 14 and setting a threshold value halfway therebetween. The sampled data word is compared in comparator 19 with the threshold setting supplied by threshold circuit 17. Comparator 19 may be identical to comparator 16 so that its output will be based upon the final-final threshold decisions from circuit 17.

Subsequent to the second iteration refinement obtained through the implementation of FIG. 3, further iterations may be carried out on the final-final decision output of comparator 19, as desired, to further reduce error rate, using the same bit pair analysis technique described for the first and second iterations.

The above description treats a two bit memory span, with decisions for each successive bit being predicated upon the knowledge of the immediately preceding bit. Modifications of this scheme are possible and the bit value assumptions may be expanded into any denied code length. For example, taking a memory span of three bits, the look-up table technique may be applied to each sequence of three bits using the most significant and least significant bit (MSB and LSB) to predict the choice for the center bit. For example, a three-bit look-up table may be configured as shown in Table 2, below, wherein exemplary stored average values for the training sequence which have been placed in memory are tabulated in the right-hand column for the respective three bit sequences shown in the left-hand column.

TABLE 2

(Three bit look-up Table)

| Binary Input (Three Bit Sequence) | Stored Average in Look-Up Table memory (volts) |
|---|---|
| 000 | −0.923 |
| 001 | −0.795 |
| 010 | +0.332 |
| 011 | +0.591 |
| 100 | −0.500 |
| 101 | −0.501 |
| 110 | +0.874 |
| 111 | +0.990 |

For the three bit sequences wherein the MSB and LSB are given, there will be four threshold settings available, i.e. for each of the sets 0X0, 0X1, 1X0, 1X1, where X is the unknown center bit. Therefore, for a three bit implementation, each of tentative decision circuit 12 and register 20 requires an extra storage stage for assembling the appropriate pair of eight addresses in memory 14 storing the averages of the sample values. In addition, since a determination of the middle bit depends upon the next succeeding bit, appropriate delay circuitry, such as delay 11 shown in broken lines, must be inserted between the output of sampling circuit 10 and averaging circuit 13, for the configuration shown in FIG. 2, and a further one symbol delay circuit, such as delay 11 shown in broken lines, must be inserted between the output of the first delay circuit 11 and the input to comparator 19 for the circuit of FIG. 3. Of course, if the to be decided symbol in question is the most recent symbol for a three symbol sequence, such delays are unnecessary. They are used only to ensure that the decision in the bit in question is carried out having all symbols necessary for the calculation. Therefore, as an example, using the values tabulated in Table 2, for the three bit sequence 1X1, the addresses for sequence 101 and 111 will be generated by tentative decision circuit 12, and the values −0.501 and +0.990 will be supplied to threshold circuit 15. The value halfway between these voltage values is +0.244 volts, which is then compared with the center bit or data sample in comparator 16 to derive a final decision as to the value of the center bit. Using the scheme shown in FIG. 3, then a further addressing of memory 14 may proceed and a final-final iteration effected.

In the above examples, the invention has been described for two and three symbol memory spans wherein each data symbol consisted of a single binary bit. However, the symbols may be of a multi-bit length and the memory span, in reality, is unlikely to be finite, so that some variation about the mean values stored in the look-up table memory can be anticipated due to symbols beyond the span covered by the look-up table. With present day memories, the size of the table can be adequately expanded to effect a reasonable implementation of the invention to provide a satisfactory degree of distortion compensation. It has been found that the mean value of the decided-upon symbol and the variance about the mean value does not change substantially for sequence lengths from seven to three symbols, but is affected for a sequence length less than three. Thus, a memory span of at least three symbols and the configuration shown in FIG. 3 comprise an especially preferred embodiment of the invention.

While I have shown and described several embodiments in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are obvious to one or ordinary skill in the art.

I claim:

1. In a data communications system for processing received data transmitted through a data transmission path containing memoryful non-linearities, wherein received data to be processed is sampled, to provide sequential values representative of transmitted data symbols, a method for combatting the effects of said memoryful non-linearities in said transmitted data comprising the steps of:

storing, in a memory, a plurality of data symbol set values representative of the average effects imparted by the memoryful non-linearity-containing transmission path on pluralities of each of the respective sets of data symbols of which transmitted data to be processed may be comprised;

converting sequentially sampled values representative of received data symbols transmitted through said data transmission path into a first series of data symbols;

successively addressing said memory in accordance with the sequential sets of data symbols contained within said first series of data symbols, and thereby reading out from said memory, for each of said sequential sets, a first data symbol set value contained in the memory location identified by said each of said sequential sets, and a second data symbol set value contained in a memory location identified by another data symbol set which differs from said each symbol set by one of the symbols therein;

comparing a respective sequentially sampled value representative of a received data symbol, the location of which received data symbol coincides with the location of said one of said symbols in said each of said sequential sets, with a threshold value defined in accordance with said first and second data symbol set values; and decoding said respective sequentially sampled value as the symbol contained in said location of either said first data symbol set or said second data symbol set, in accordance with whether or not said sequentially sampled value exceeds said threshold value, whereby, for said sequentially sampled values of received data symbols there is obtained a decoded series of data symbols corresponding to the data symbols transmitted through said data transmission path.

2. A method according to claim 1, wherein said threshold value is the average of said first and second data symbol set values.

3. A method according to claim 1, further including the steps of:

transmitting a known sequence of data symbol signals corresponding to a known sequence of data symbols, containing said pluralities of each of the respective sets of data symbols, through said non-linearity containing transmission path;

receiving and successively sampling the values of the signals corresponding to said known sequence of data symbols;

successively addressing said memory in accordance with sequential groups of the data symbols known to be represented by the successively sampled values of said received sequence of data symbol signals, and thereby reading out from said memory, for each of said sequential groups, the contents of the memory address identified by said each group;

combining each respective successively sampled signal value with the contents of a memory address identified by a group of data symbols which contains, at a prescribed position in said group, the data symbol whose location in said known sequence of data symbols corresponds to the location of said successively sampled signal value in the received sequence of data symbol signals, and thereby generating an average data symbol group value; and storing said average data symbol group value into said memory address, each average data symbol group value corresponding to each respective data symbol set value upon completion of the sampling of said received signals and successive addressing of said memory for the entirety of said known sequence of data symbols.

4. A method according to claim 1, wherein said converting step comprises the step of comparing each sequentially sampled value with a reference value and decoding said sampled value as a first prescribed data symbol if said sampled value exceeds said reference value, and decoding said sampled value as a second prescribed data symbol of said sampled value does not exceed said reference value.

5. A method according to claim 4, wherein said first and second prescribed data symbols are respectively different binary symbols.

6. A method according to claim 1, further comprising the steps of:

further successively addressing said memory in accordance with sequential sets of decoded data symbols contained within said decoded series of data symbols, and thereby reading out from said memory, for each of said sequential sets of decoded data symbols, a third data symbol set value contained in the memory location identified by said each of said sequential sets of decoded data symbols, and a fourth data symbol set value contained in a memory location identified by another data symbol set which differs from said each of said sequential sets of decoded data symbols by one of the symbols therein;

further comparing said respective sequentially sampled value representative of a received data symbol, the location of which received data symbol coincides with the location of said one of said symbols in said each of said sequential sets of decoded data symbols, with a further threshold value defined in accordance with said third and fourth data symbol set values; and further decoding said respective sequentially sampled value as that symbol which is contained in said location of either said third data symbol set or said second data symbol set, in accordance with whether or not said sequentially sampled value exceeds said further threshold value, whereby, for said sequentially sampled values of received data symbols there is obtained a refined decoded series of data symbols corresponding to the data symbols transmitted through said data transmission path.

7. A method according to claim 6, further including the steps of:

transmitting a known sequence of data symbol signals corresponding to a known sequence of data symbols, containing said pluralities of each of the respective sets of data symbols, through said non-linearity containing transmission path;

receiving and successively sampling the values of the signals corresponding to said known sequence of data symbols;

successively addressing said memory in accordance with sequential groups of the data symbols known to be represented by the successively sampled values of said received sequence of data symbol signals, and thereby reading out from said memory, for each of said sequential groups, the contents of the memory address identified by said each group;

combining each respective successively sampled signal value with the contents of a memory address identified by a group of data symbols which contains, at a prescribed position in said group, the data symbol whose location in said known sequence of data symbols corresponds to the location of said successively sampled signal value in the received sequence of data symbol signals, and thereby generating an average data symbol group value; and storing said average data symbol group value into said memory address, each average data symbol group value corresponding to each respective data symbol set value upon completion of the sampling of said received signals and successive addressing of said memory for the entirety of said known sequence of data symbols.

8. A method according to claim 7, wherein said threshold value is the average of said first and second data symbol set values.

9. A method according to claim 8, wherein said converting step comprises the step of comparing each sequentially sampled value with a reference value and decoding said sampled value as a first prescribed data symbol if said sampled value exceeds said reference value, and decoding said sampled value as a second prescribed data symbol of said sampled value does not exceed said reference value.

10. A method according to claim 9, wherein said first and second prescribed data symbols are respectively different binary symbols.

11. A method according to claim 6, wherein said converting step comprises the step of comparing each sequentially sampled value with a reference value and decoding said sampled value as a first prescribed data symbol if said sampled value exceeds said reference value, and decoding said sampled value as a second prescribed data symbol of said sampled value does not exceed said reference value.

12. A method according to claim 11, wherein said first and second prescribed data symbols are respectively different binary symbols.

13. A method according to claim 11, further including the steps of:

transmitting a known sequence of data symbol signals corresponding to a known sequence of data symbols, containing said pluralities of each of the respective sets of data symbols, through said non-linearity containing transmission path;

receiving and successively sampling the values of the signals corresponding to said known sequence of data symbols;

successively addressing said memory in accordance with sequential groups of the data symbols known to be represented by the successively sampled values of said received sequence of data symbol signals, and thereby reading out from said memory, for each of said sequential groups, the contents of the memory address identified by said each group;

combining each respective successively sampled signal value with the contents of a memory address identified by a group of data symbols which contains, at a prescribed position in said group, the data symbol whose location in said known sequence of data symbols corresponds to the location of said successively sampled signal value in the received sequence of data symbol signals, and thereby generating an average data symbol group value; and storing said average data symbol group value into said memory address, each average data symbol group value corresponding to each respective data symbol set value upon completion of the sampling of said received signals and successive addressing of said memory for the entirety of said known sequence of data symbols.

14. A data communications receiver system for processing received data transmitted through a data transmission path containing memoryful non-linearities, wherein received data to be processed is sampled, to provide sequential values representative of transmitted data symbols, wherein the effects of said memoryful non-linearities on said transmitted data are combatted comprising:

a memory storing a plurality of data symbol set values representative of the average effects imparted by the memoryful non-linearity-containing transmission path on pluralities of each of the respective sets of data symbols of which transmitted data to be processed may be comprised;

first means for converting sequentially sampled values representative of received data symbols transmitted through said data transmission path into a first series of data symbols and successively addressing said memory in accordance with the sequential sets of data symbols contained within said first series of data symbols, and thereby reading out from said memory, for each of said sequential sets, a first data symbol set value contained in the memory location identified by said each of said sequential sets and a second data symbol set value contained in a memory location identified by another data symbol set which differs from said each symbol set by one of the symbols therein; and second means, coupled to said memory and coupled to receive said sequentially sampled values, for comparing a respective sequentially sampled value representative of a received data symbol, the location of which received data symbol coincides with the location of said one of said symbols in said each of said sequential sets, with a threshold value defined in accordance with said first and second data symbol set values, and thereby decoding said respective sequentially sampled value as the symbol contained in said location of either said first data symbol set or said second data symbol set, in accordance with whether or not said sequentially sampled value exceeds said threshold value, whereby, for said sequentially sampled values of received data symbols there is obtained a decoded series of data symbols corresponding to the data symbols transmitted through said data transmission path.

15. A data communications receiver system according to claim 14, wherein said second means includes threshold means, coupled to the output of said memory, for generating threshold values as the average of said first and second data symbol set values.

16. A data communications receiver system according to claim 15, wherein said second means further includes delay means, coupled to receive said sequentially sampled values, for delaying said sequentially sampled values by one sample period, and comparison means for comparing the outputs of said threshold means and said delay means.

17. A data communications receiver system according to claim 14, further comprising:

third means for receiving a known sequence of data symbol signals, corresponding to a known sequence of data symbols containing said pluralities of each of the respective sets of data symbols, transmitted through said non-linearity containing transmission paths and successively sampling the values of the signals corresponding to said known sequence of data symbols;

fourth means, coupled to said third means, for successively addressing said memory in accordance with sequential groups of the data symbols known to be represented by the successively sampled values of said received sequence of data symbol signals, and thereby reading out from said memory, for each of said sequential groups, the contents of the memory address identified by said each group;

fifth means, coupled to said memory and said third means, for combining each respective successively sampled signal value with the contents of a memory address identified by a group of data symbols which contains, at a prescribed position in said group, the data symbol whose location in said known sequence of data symbols corresponds to the location of said successively sampled signal value in the received sequence of data symbol signals, and thereby generating an average data symbol group value, and supplying said average data symbol group value to said memory address, each average data symbol group value corresponding to each respective data symbol set value upon completion of the sampling of said received signals and successive addressing of said memory for the entirety of said known sequence of data symbols.

18. A data communications receiver system according to claim 14, wherein said first means comprises means for comparing each sequentially sampled value with a reference value and decoding said sampled value as a first prescribed data symbol if said sampled value exceeds said reference value, and decoding said sampled value as a second prescribed data symbol if said sampled value does not exceed said reference value.

19. A data communications receiver system according to claim 18, wherein said first and second prescribed data symbols are respectively different binary symbols.

20. A data communications receiver system according to claim 14, further comprising:

third means, coupled to said second means, for further successively addressing said memory in accordance with sequential sets of decoded data symbols contained within said decoded series of data symbols, and thereby reading out from said memory, for each of said sequential sets of decoded data symbols, a third data symbol set value contained in the memory location identified by said each of said sequential sets of decoded data symbols, and a fourth data symbol set value contained in a memory location identified by another data symbol set which differs from said each of said sequential sets of decoded data symbols by one of the symbols therein, and fourth means, coupled to said memory and coupled to receive said sequentially sampled values, for comparing each of said respective sequentially sampled values representative of a received data symbol, the location of which received data symbol coincides with the location of said one of said symboles in said each of said sequential sets of decoded data symbols, with a further threshold value defined in accordance with said third and fourth data symbol set values, and decoding said respective sequentially sampled value as that symbol which is contained in said location of either said third data symbol set or said second data symbol set, in accordance with whether or not said sequentially sampled value exceeds said further threshold value, whereby, for said sequentially sampled values of received data symbols, there is obtained a refined decoded series of data symbols corresponding to the data symbols transmitted through said data transmission path.

21. A data communications receiver system according to claim 20, further comprising:

fifth means, for receiving a known sequence of data symbol signals corresponding to a known sequence of data symbols, containing said pluralities of each of the respective sets of data symbols, transmitted through said non-linearity containing transmission paths and successively sampling the values of the signals corresponding to said known sequence of data symbols;

sixth means, coupled to said fifth means, for successively addressing said memory in accordance with sequential groups of the data symbols known to be represented by the successively sampled values of said received sequence of data symbol signals, and thereby reading out from said memory, for each of said sequential groups, the contents of the memory address identified by said each group;

seventh means, coupled to said memory and said fifth means, for combining each respective successively sampled signal value with the contents of a memory address identified by a group of data symbols which contains, at a prescribed position in said group, the data symbol whose location in said known sequence of data symbols corresponds to the location of said successively sampled signal value in the received sequence of data symbol signals, and thereby generating an average data symbol group value, and supplying said average data symbol group value corresponding to each respective data symbol set value upon completion of the sampling of said received signals and successive addressing of said memory for the entirety of said known sequence of data symbols.

22. A data communications receiver system according to claim 21, wherein said second means includes threshold means, coupled to the output of said memory, for generating threshold values as the average of said first and second data symbol set values.

23. A data communications receiver system according to claim 22, wherein said first means comprises means for comparing each sequentially sampled value with a reference value and decoding said sampled value as a first prescribed data symbol if said sampled value exceeds said reference value, and decoding said sampled value as a second prescribed data symbol if said sampled value does not exceed said reference value.

24. A data communications receiver system according to claim 23, wherein said first and second prescribed data symbols are respectively different binary symbols.

25. A data communications receiver system according to claim 24, wherein said second means further includes delay means, coupled to receive said sequentially sampled values, for delaying said sequentially sampled values by one sample period, and comparison means for comparing the outputs of said threshold means and said delay means.

26. A data communications receiver system according to claim 20, wherein said first means comprises means for comparing each sequentially sampled value with a reference value and decoding said sampled value as a first prescribed data symbol if said sampled value as a first prescribed data symbol if said sampled value exceeds said reference value, and decoding said sampled value as a second prescribed data symbol if said sampled value does not exceed said reference value.

27. A data communications receiver system according to claim 26, wherein said first and second prescribed data symbols are respectively different binary symbols.

28. A data communications receiver system according to claim 26, further comprising:

fifth means, for receiving a known sequence of data symbol signals, corresponding to a known sequence of data symbols, containing said pluralities of each of the respective sets of data symbols transmitted through said non-linearity containing transmission paths, and successively sampling the values of the signals corresponding to said known sequence of data symbols;

sixth means, coupled to said fifth means, for successively addressing said memory in accordance with sequential groups of the data symbols known to be represented by the successively sampled values of said received sequence of data symbol signals, and thereby reading out from said memory, for each of said sequential groups, the contents of the memory address identified by said each group;

seventh means, coupled to said memory and said fifth means, for combining each respective successively sampled signal value with the contents of a memory address identified by a group of data symbols which contains, at a prescribed positions in said group, the data symbol whose location in said known sequence of data symbols corresponds to the location of said successively sampled signal value in the received sequence of data symbol signals, and thereby generating an average data symbol group value, and supplying said average data symbol group value corresponding to each respective data symbol set value upon completion of the sampling of said received signals and successive addressing of said memory for the entirety of said known sequence of data symbols.

29. A data communications receiver system according to claim 25, wherein said fourth means includes further threshold means, coupled to the output of said memory, for generating said further threshold value as the average of said first and second data symbol set values, further delay means, coupled to the output of said first mentioned delay means, for delaying the delayed sequentially sampled values by one further sample period, and further comparison means, for comparing the outputs of said further threshold means and said further delay means.

* * * * *